US012287664B2

(12) United States Patent
Chi et al.

(10) Patent No.: US 12,287,664 B2
(45) Date of Patent: Apr. 29, 2025

(54) KNOB ASSEMBLY

(71) Applicant: PEGATRON CORPORATION, Taipei (TW)

(72) Inventors: Chih-Heng Chi, Taipei (TW); Yu-Hsiao Chang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 18/667,382

(22) Filed: May 17, 2024

(65) Prior Publication Data

US 2025/0044824 A1 Feb. 6, 2025

(30) Foreign Application Priority Data

Aug. 2, 2023 (TW) ................................ 112129160

(51) Int. Cl.
*G05G 1/10* (2006.01)
*G05G 5/00* (2006.01)

(52) U.S. Cl.
CPC ............... *G05G 1/10* (2013.01); *G05G 5/005* (2013.01); *G05G 2505/00* (2013.01)

(58) Field of Classification Search
CPC ... F16H 1/10; F16H 1/12; F16H 5/005; F16H 5/02; F16H 5/04; F16H 5/06; F16H 2505/00
See application file for complete search history.

(56) References Cited

U.S. PATENT DOCUMENTS

2004/0093968 A1 5/2004 Oster
2012/0285288 A1* 11/2012 Chinigo .................. G05G 5/06 29/525.01
2024/0111324 A1* 4/2024 Ji ............................ G05G 9/02

FOREIGN PATENT DOCUMENTS

CN 207529864 U 6/2018
CN 217641088 U 10/2022
CN 218567960 U 3/2023
KR 200143482 Y1 * 6/1999
TW 227831 U 8/1994
TW 200538092 A 12/2005

* cited by examiner

*Primary Examiner* — Adam D Rogers
(74) *Attorney, Agent, or Firm* — McClure, Qualey & Rodack, LLP

(57) ABSTRACT

A knob assembly is assembled in a housing, to drive a rotary shaft. The housing includes a groove and a perforation. The knob assembly includes a tightening ring, a sliding member, and a knob. The sliding member includes a through hole, a release groove, and a tightening groove. A diameter of the release groove is greater than that of the tightening groove. The knob includes a rotary table and a central shaft. The central shaft is connected to the rotary table, sequentially penetrates through the through hole and the tightening ring to the perforation, and is sleeved on the rotary shaft. When the sliding member is moved from a release position to a locking position, the tightening ring is moved from the release groove to the tightening groove, to enable the tightening ring to tightly wrap the central shaft, so as to fix the knob.

11 Claims, 9 Drawing Sheets

D-D

KNOB ASSEMBLY

CROSS-REFERENCE TO RELATED APPLICATION

This application claims the priority benefit of Taiwan application serial no. 112129160, filed on Aug. 2, 2023. The entirety of the above-mentioned patent application is hereby incorporated by reference herein and made a part of this specification.

TECHNICAL FIELD

The present disclosure relates to a knob assembly, and in particular, to a knob assembly with a locking structure.

BACKGROUND

Common knob assemblies may be divided into a stepless knob assembly and a step knob assembly. The stepless knob assembly is usually not controlled by a node and can be used for precise fine-tuning. The step knob assembly is usually designed with an elastic sheet or a buckle, and mostly has a fixed function. The conventional knob assembly is used by directly connecting the knob assembly to an axis of an encoder, and the encoder may be driven when the knob assembly is rotated. However, usually, precise fine-tuning can be performed on the stepless knob assembly but a position of the knob assembly cannot be fixed, and consequently, setting inaccuracy is prone to be caused by movement or vibration of a machine. The step knob assembly has a function of locking, but fine-tuning cannot be performed.

SUMMARY

In view of the above, an embodiment of the present disclosure provides a knob assembly. The knob assembly is assembled in a housing, to drive a rotary shaft disposed in the housing. The housing includes a groove and a perforation, the perforation is located in the groove, and the rotary shaft penetrates through the perforation. The knob assembly includes a tightening ring, a sliding member, and a knob. The tightening ring is disposed in the groove and is aligned with the perforation. The sliding member includes a through hole, a release groove, and a tightening groove. The release groove and the tightening groove are disposed adjacently and are in communication with each other. A diameter of the release groove is greater than a diameter of the tightening groove. The sliding member is slidably disposed in the housing, to enable the tightening ring to be accommodated in the release groove or the tightening groove. The knob includes a rotary table and a central shaft. The central shaft is connected to the rotary table, sequentially penetrates through the through hole of the sliding member and the tightening ring to the perforation, and is sleeved on the rotary shaft. When the sliding member is moved from a release position to a locking position, the tightening ring is moved from the release groove to the tightening groove, to enable the tightening ring to tightly wrap the central shaft of the knob, to fix a position of the knob.

In this way, after required rotation setting is performed on the knob of the knob assembly, the sliding member may be moved to the locking position through an operation, so that the tightening ring fixes the knob. Therefore, the knob cannot be easily rotated, thereby achieving position fixing. In this way, a precise fine-tuning function of a stepless knob assembly can be retained, and a position of the knob assembly can further be fixed after adjustment, to avoid setting inaccuracy caused by movement or vibration of an apparatus or a machine.

DETAILED DESCRIPTION

Figure 1:
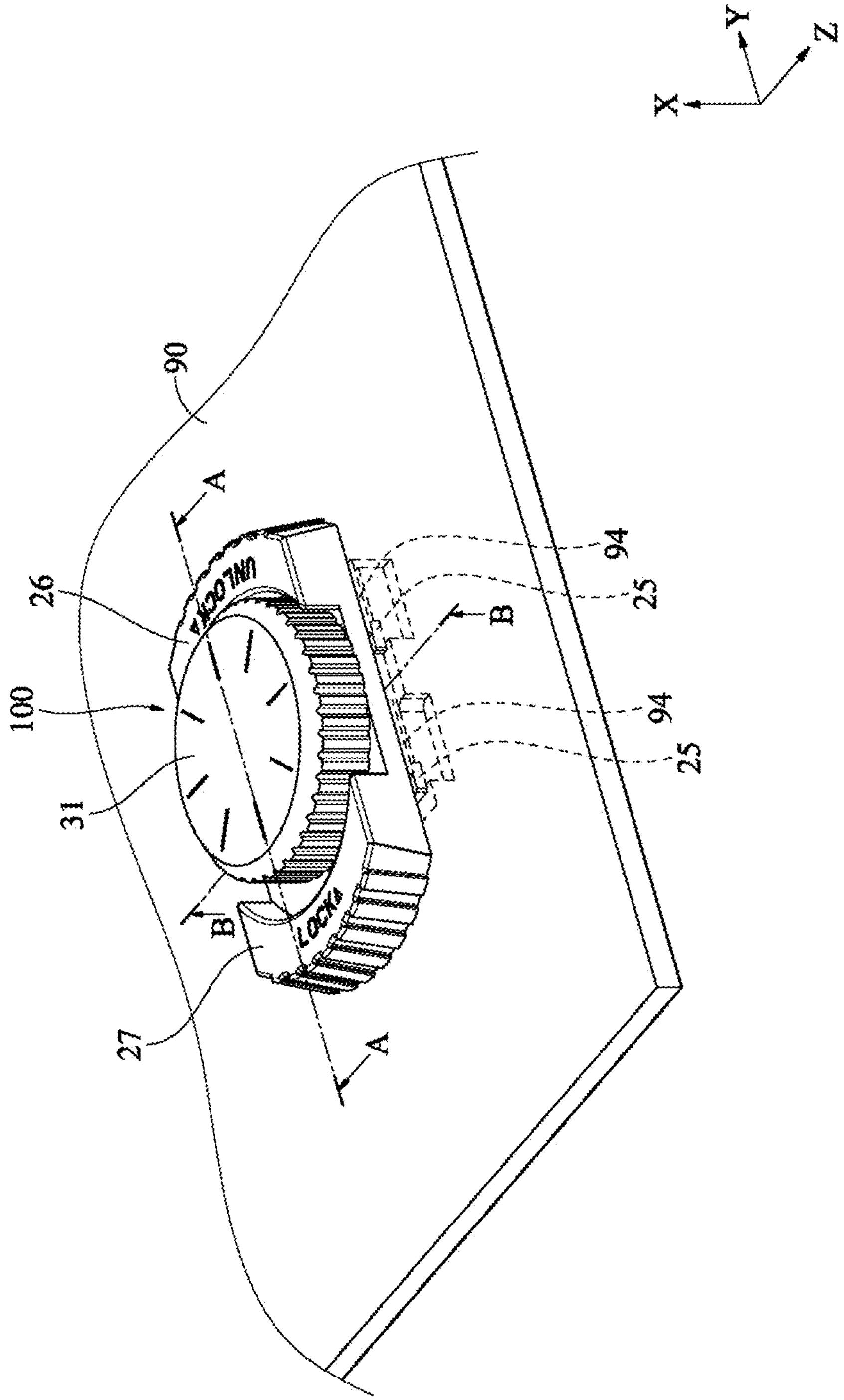
FIG. 1 is a three-dimensional diagram of a knob assembly assembled in a housing at a release position according to an embodiment of the present disclosure.

An embodiment is provided and described in detail in the following. However, the embodiment is merely used as an example for description, and does not limit the protection scope of the present disclosure. In addition, some assemblies are omitted in the drawings in the embodiment, to clearly show technical characteristics of the present disclosure. Same reference numerals in the drawings are used to represent same or similar assemblies.

Figure 2:
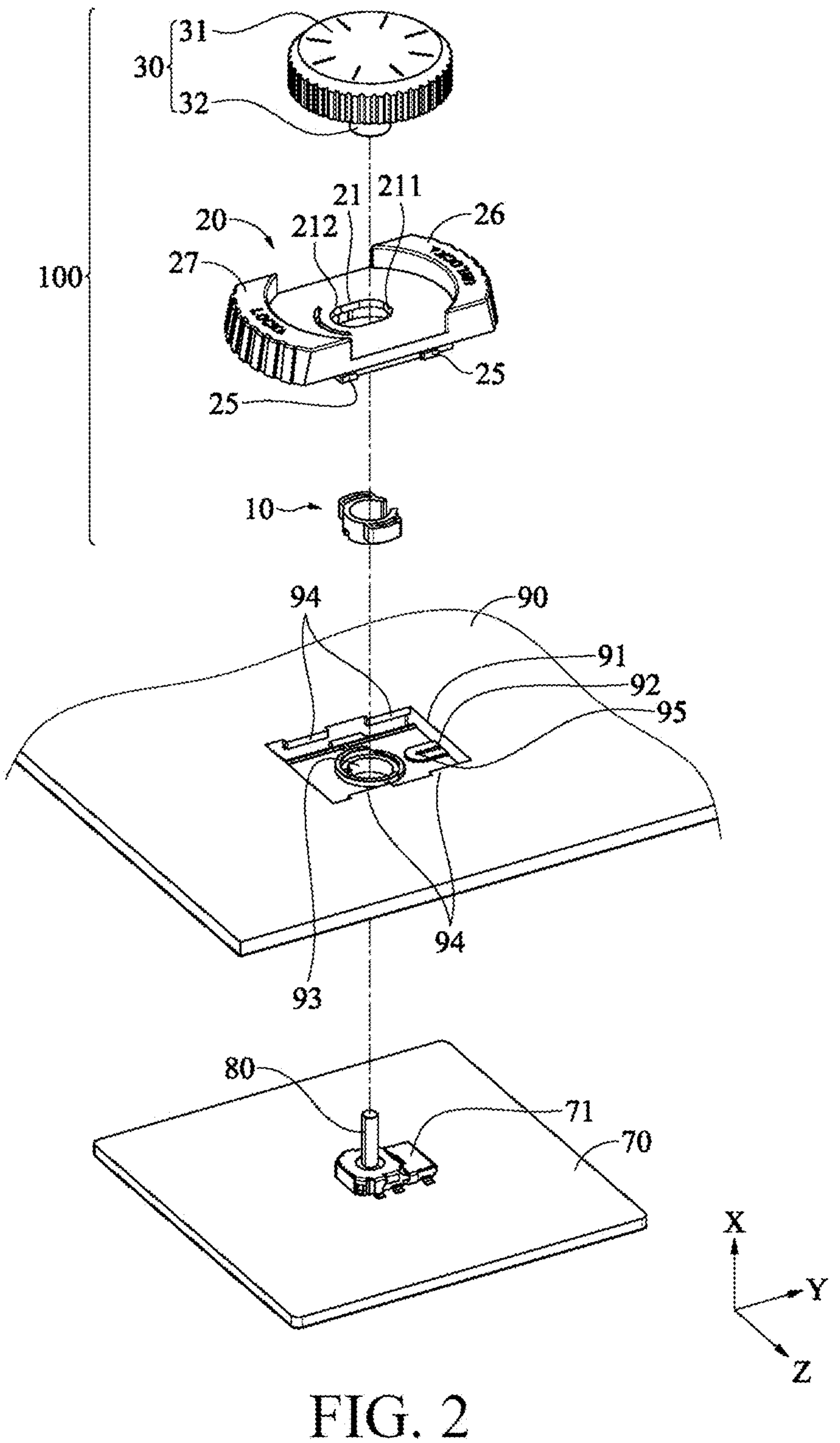
FIG. 2 is an exploded view of a knob assembly, a housing, and a rotary shaft according to an embodiment of the present disclosure.

Refer to FIG. 1 and FIG. 2 first. FIG. 1 is a three-dimensional diagram of a knob assembly assembled in a housing at a release position according to an embodiment of the present disclosure. FIG. 2 is an exploded view of a knob assembly, a housing, and a rotary shaft according to an embodiment of the present disclosure. A knob assembly 100 is assembled in a housing 90, to drive a rotary shaft 80 disposed in the housing 90. The housing 90 includes a groove 91 and a perforation 93, and the perforation 93 is located in the groove 91. The rotary shaft 80 penetrates through the perforation 93. The rotary shaft 80 may be, for example, a rotary shaft of an encoder used for rotation adjustment, or a rotary shaft of another assembly that performs an operation through rotation. In this embodiment, the rotary shaft 80 of an encoder 71 assembled in a circuit board 70 is used as an example. The circuit board 70 is disposed on an inner side of the housing 90. The rotary shaft 80 protrudes from the inner side of the housing 90 to an outer side of the housing 90 through the perforation 93, to help assemble knob assembly 100 to perform an operation.

Figure 3:
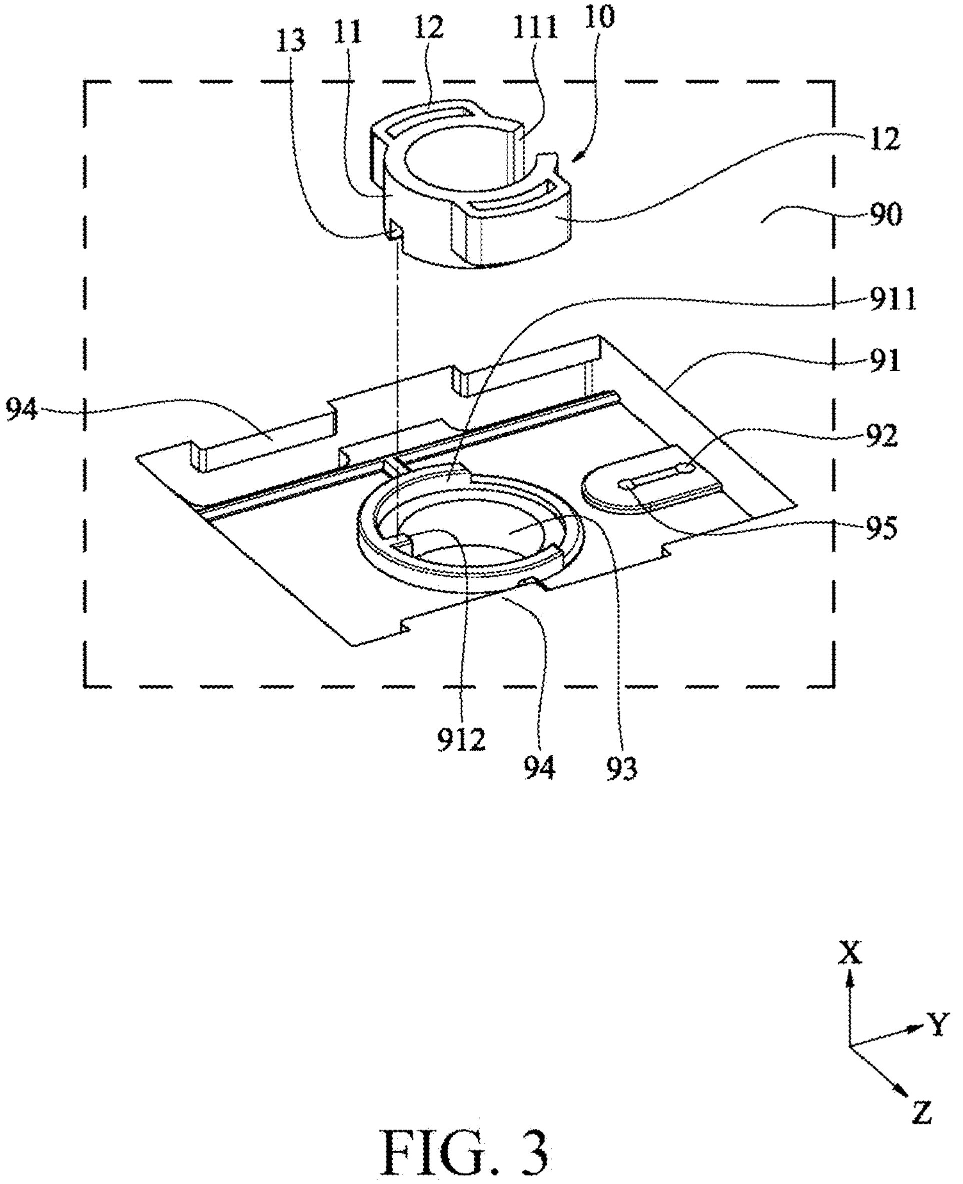
FIG. 3 is a schematic three-dimensional diagram of assembling a tightening ring in a housing according to an embodiment of the present disclosure.
Figure 4:
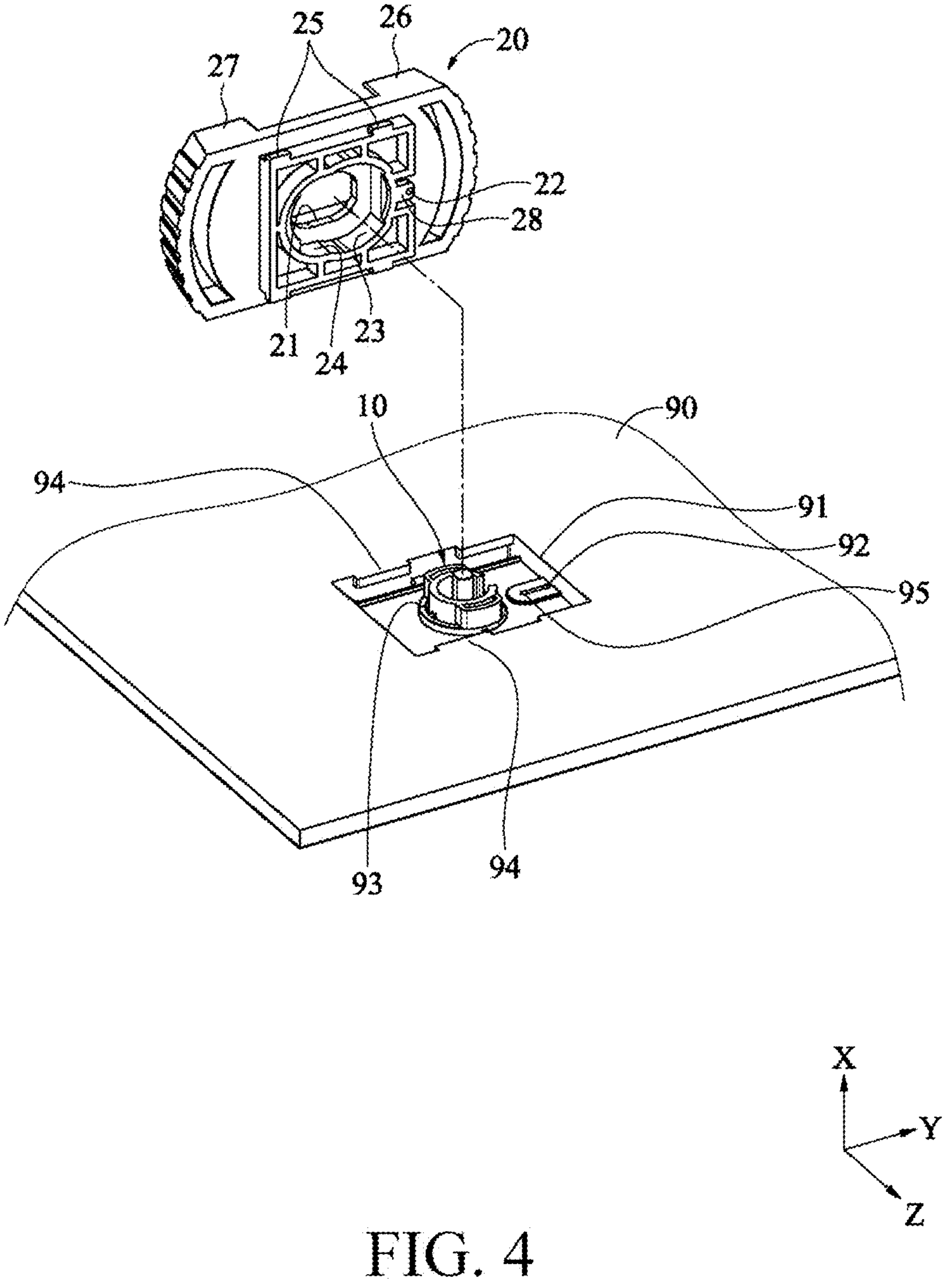
FIG. 4 is a schematic three-dimensional diagram of assembling a sliding member in a housing according to an embodiment of the present disclosure.
Figure 5:
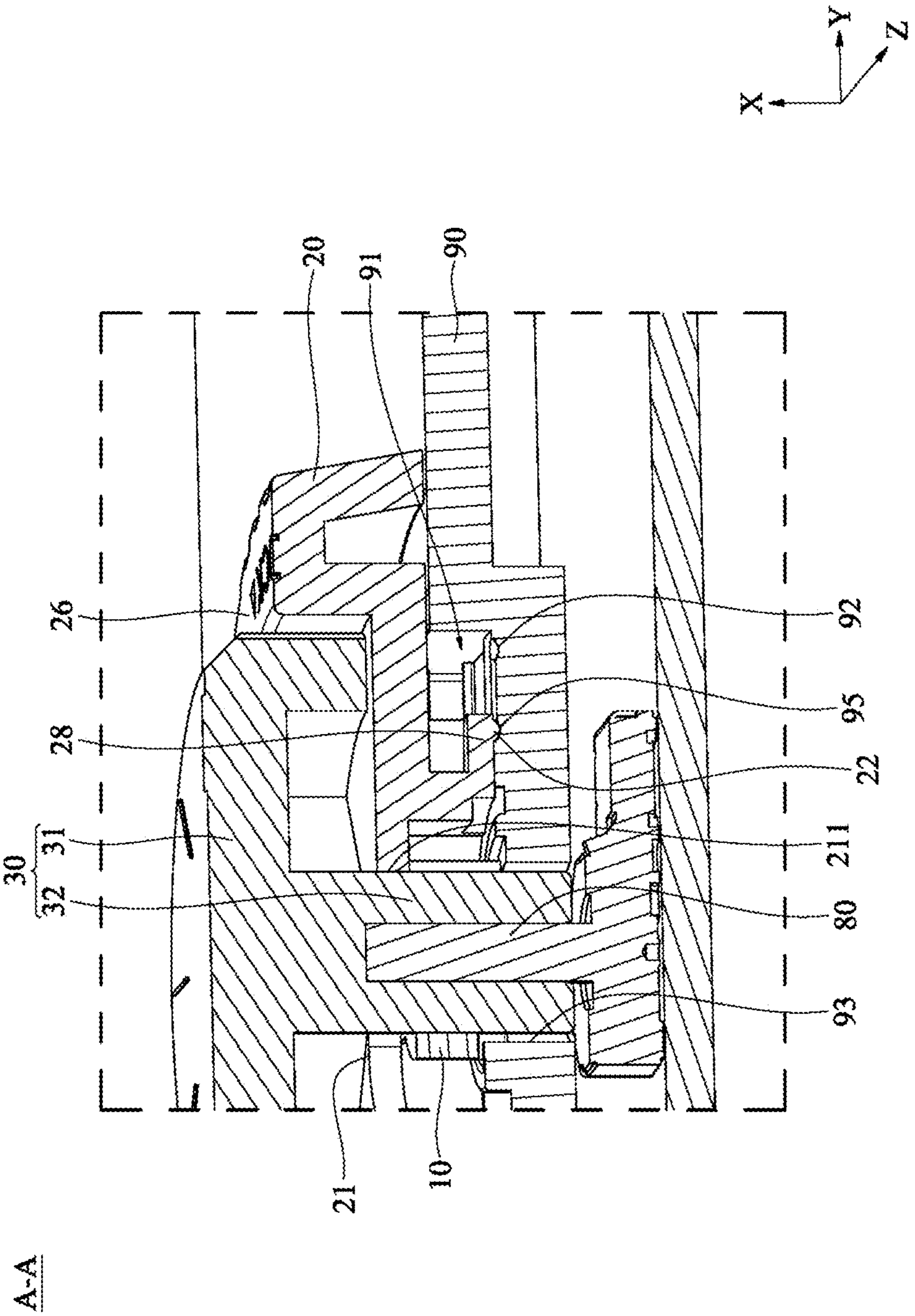
FIG. 5 is a schematic partial cross-sectional view along a section line A-A in FIG. 1 when a sliding member is located at a release position according to an embodiment of the present disclosure.
Figure 6:
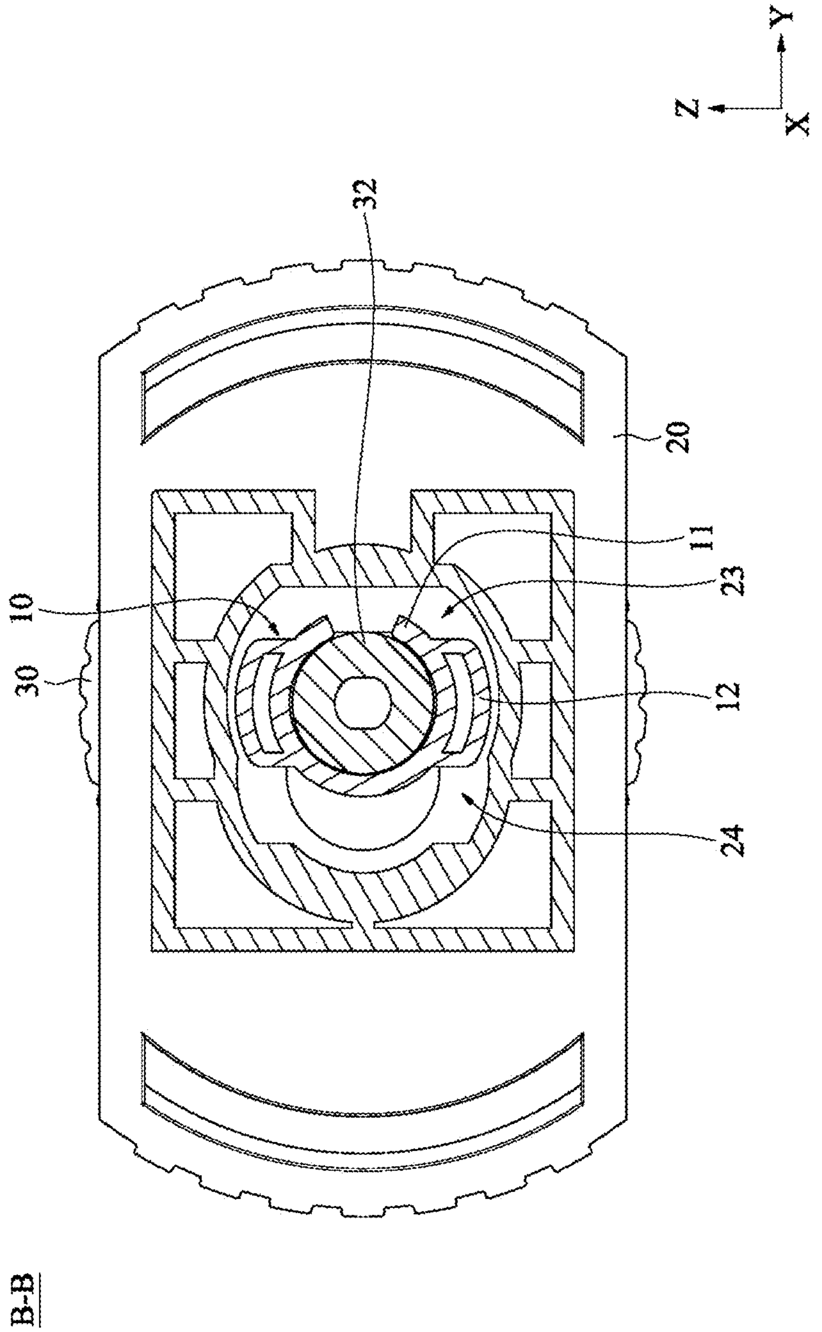
FIG. 6 is a schematic partial cross-sectional view along a section line B-B in FIG. 1 when a sliding member is located at a release position according to an embodiment of the present disclosure.
Figure 9:
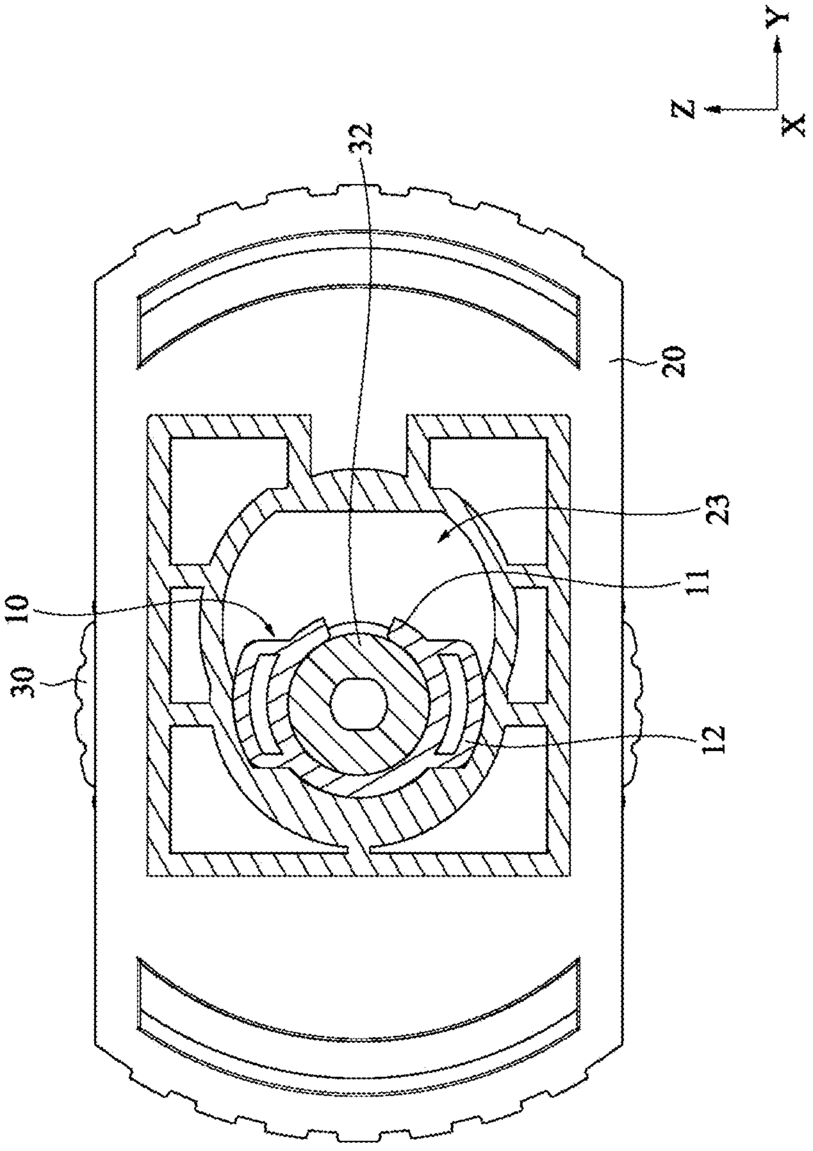
FIG. 9 is a schematic partial cross-sectional view along a section line D-D in FIG. 7 when a sliding member is located at a locking position according to an embodiment of the present disclosure.

The knob assembly 100 includes a tightening ring 10, a sliding member 20, and a knob 30. Refer to FIG. 3 to FIG. 6 together. FIG. 3 is a schematic three-dimensional diagram of assembling a tightening ring in a housing according to an embodiment of the present disclosure. FIG. 4 is a schematic three-dimensional diagram of assembling a sliding member in a housing according to an embodiment of the present disclosure. FIG. 5 is a schematic partial cross-sectional view along a section line A-A in FIG. 1 and that is of a relative position relationship between a second positioning portion and a first positioning portion when a sliding member is located at a release position according to an embodiment of the present disclosure. FIG. 6 is a schematic partial cross-sectional view along a section line B-B in FIG. 1 and in which a tightening ring is located in a release groove when a sliding member is located at a release position according to an embodiment of the present disclosure. It can be learned from FIG. 3 that the tightening ring 10 is disposed in the groove 91 and is aligned with the perforation 93. The sliding member 20 includes a through hole 21, a release groove 23, and a tightening groove 24. It can be learned from FIG. 4 and FIG. 6 that the release groove 23 and the tightening groove 24 are disposed adjacently and are in communication with each other. The release groove 23 and the tightening groove 24 are located below the through hole 21. A diameter of the release groove 23 is greater than a diameter of the tightening groove 24. The sliding member 20 is slidably disposed in the housing 90, to enable the tightening ring 10 to be accommodated in the release groove 23 (as shown in FIG. 6) or the tightening groove 24 (as shown in FIG. 9, described in detail later).

Refer to FIG. 2 and FIG. 5 again. The knob 30 includes a rotary table 31 and a central shaft 32. The central shaft 32 is connected to the rotary table 31, sequentially penetrates through the through hole 21 of the sliding member 20 and the tightening ring 10 to the perforation 93, and is sleeved on the rotary shaft 80.

Figure 7:
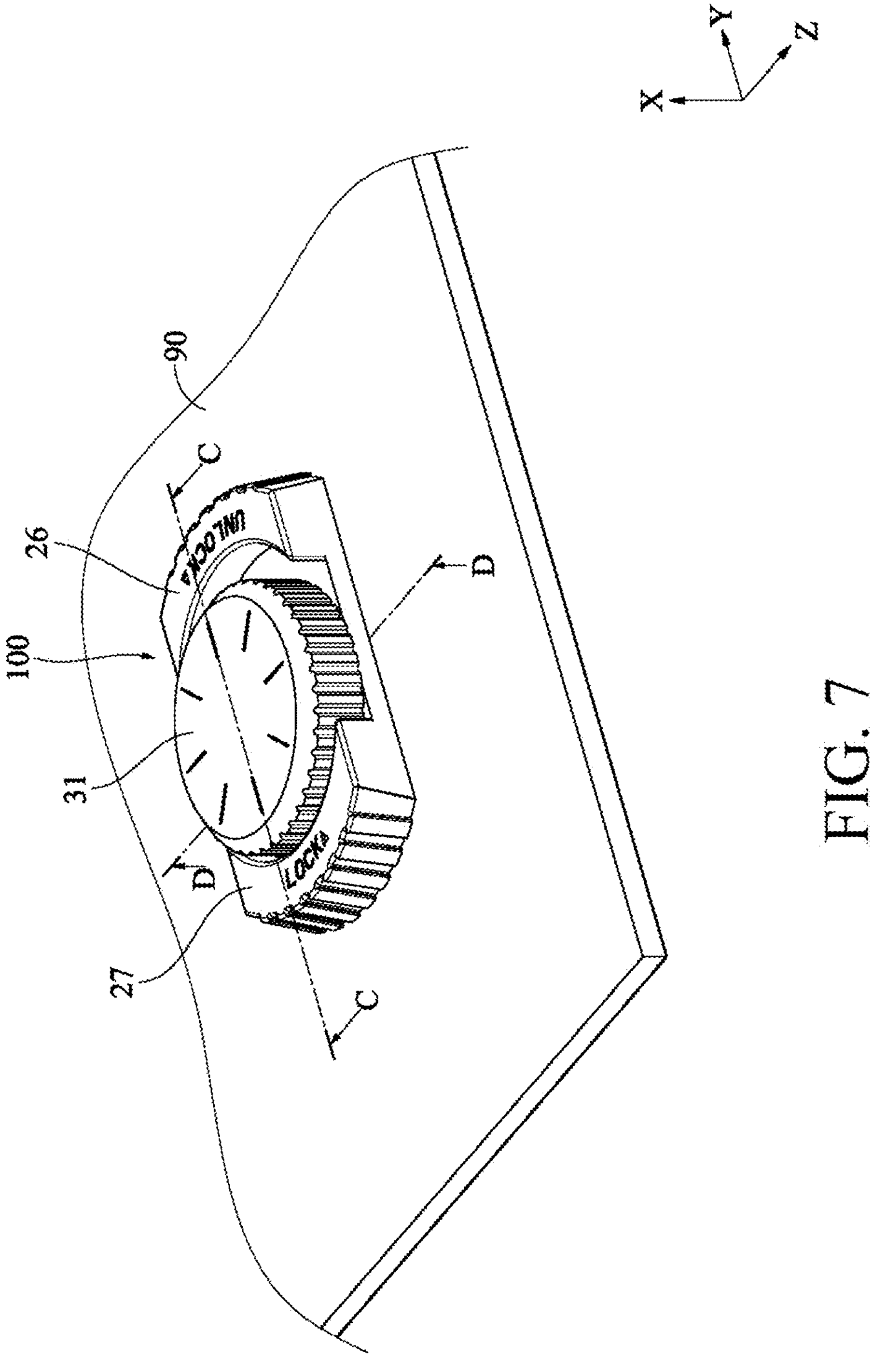
FIG. 7 is a schematic three-dimensional diagram of a knob assembly assembled in a housing at a locking position according to an embodiment of the present disclosure.
Figure 8:
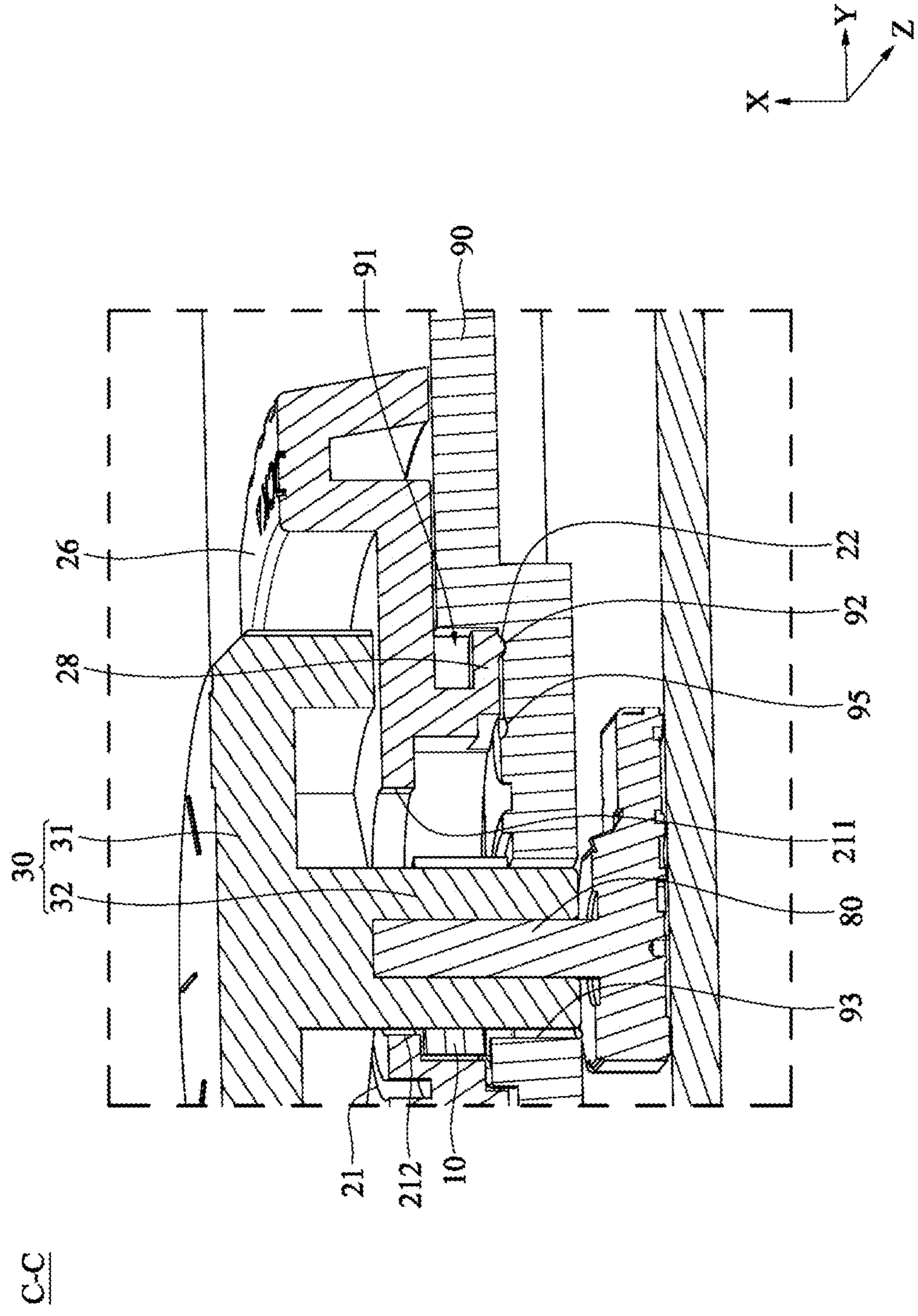
FIG. 8 is a schematic partial cross-sectional view along a section line C-C in FIG. 7 when a sliding member is located at a locking position according to an embodiment of the present disclosure.

The following describes how to lock and fix the knob 30 after an operation is completed, to avoid the knob 30 rotates due to improper contact. Refer to FIG. 4 to FIG. 9 together. FIG. 7 is a schematic three-dimensional diagram of a knob assembly assembled in a housing at a locking position according to an embodiment of the present disclosure. FIG. 8 is a schematic partial cross-sectional view along a section line C-C in FIG. 7 and that is of a relative position relationship between a second positioning portion and a first positioning portion when a sliding member is located at a locking position according to an embodiment of the present disclosure. FIG. 9 is a schematic partial cross-sectional view along a section line D-D in FIG. 7 and in which a tightening ring is located in a tightening groove when a sliding member is located at a locking position according to an embodiment of the present disclosure.

After the knob assembly 100 is assembled, as shown in FIG. 5, the sliding member 20 is located at a release position. As shown in FIG. 6, the tightening ring 10 is located in the release groove 23, and the tightening ring 10 loosely surrounds the central shaft 32 of the knob 30. "Loosely surrounds" herein refers to that the tightening ring 10 surrounds the central shaft 32 but is not in contact with the central shaft 32 completely, or the tightening ring 10 is partially in contact with but is not completely tightly attached to the central shaft 32, or the tightening ring 10 surrounds and is completely in contact with but is not tightly attached to the central shaft 32, so that the central shaft 32 maintains in a state of rotating relative to the tightening ring 10. In this state, a user may operate the rotary table 31 of the knob 30 from the outer side of the housing 90, to rotate the rotary shaft 80 to a required position.

Subsequently, when the user completes the operation and wants to fix the knob 30 at the required so that the rotary table 31 no longer rotate relatively, the user may move the sliding member 20 from the release position to a locking position. As shown in FIG. 1 and FIG. 7, the user may move the sliding member 20 to a right side of the figure, to move the sliding member 20 to the locking position. When the sliding member 20 is moved to the locking position, as shown in FIG. 9, the movement of the sliding member 20 enables the release groove 23 initially corresponding to the tightening ring 10 to move to the right, and enables the tightening groove 24 to correspondingly move to a position at which the tightening ring 10 is located. The tightening ring 10 is enabled to move from the release groove 23 to the tightening groove 24 and squeeze the tightening ring 10. Therefore, the tightening ring 10 tightly wraps the central shaft 32 of the knob 30, to fix a position of the knob 30.

The foregoing "tightly wraps" refers to that the tightening ring 10 is circumferentially tightly attached to the central shaft 32, or is partially tightly attached to the central shaft 32, so that the central shaft 32 cannot rotate relative to the tightening ring 10 due to being tightly clamped by the tightening ring 10 and a friction force.

In this way, after required rotation setting is performed on the knob 30 of the knob assembly 100, the sliding member 20 may be moved to the locking position through an operation, so that the tightening ring 10 fixes the knob 30. Therefore, the knob 30 cannot be easily rotated, thereby achieving position fixing. In this way, a precise fine-tuning function of the stepless knob assembly 100 can be retained, and a position of the knob assembly 100 can further be positioned after adjustment, to avoid setting inaccuracy caused by movement or vibration of an apparatus or a machine. When the knob 30 needs to be operated again, the sliding member 20 may be reversely operated to unlock the knob 30, and the knob 30 may be operated again for rotation adjustment.

Next, refer to FIG. 2 and FIG. 3. The housing 90 further includes a first positioning portion 92 located in the groove 91. The sliding member 20 further includes a second positioning portion 22. The second positioning portion 22 may be correspondingly away from the first positioning portion 92 or in contact with the first positioning portion 92 with sliding of the sliding member 20. As shown in FIG. 5 and FIG. 8, when the sliding member 20 is moved from the release position to the locking position, the second positioning portion 22 is moved from a position away from the first positioning portion 92 to a position in contact with the first positioning portion 92.

That the second positioning portion 22 is correspondingly away from the first positioning portion 92 herein refers to that the two positioning portions are not in contact with each other. For example, in this embodiment, the first positioning portion 92 is a concave portion, and the second positioning portion 22 is a convex portion. As shown in FIG. 5, when the convex portion of the second positioning portion 22 is not accommodated in the concave portion of the first positioning portion 92, the second positioning portion 22 is away from the first positioning portion 92. That the second positioning portion 22 is in contact with the first positioning portion 92 refers to that the two positioning portions are connected to each other. As shown in FIG. 8, in this embodiment, the contact refers to that the convex portion of the second positioning portion 22 is accommodated in the concave portion of the first positioning portion 92. In another embodiment, the first positioning portion may be the protruding portion, and the second positioning portion may be the recess portion. In this case, the foregoing definition of in contact with or away from is also applicable.

During the process, when the second positioning portion 22 is in contact with the first positioning portion 92, the user may be provided with operation feel, to confirm that the sliding member 20 is operated to the locking position. In addition, aside from that the contact between the second positioning portion 22 and the first positioning portion 92, a side wall of the groove 91 may also be used for position limiting. As shown in FIG. 8, the second positioning portion 22 may be connected to an extension arm 28 with a certain length. When the sliding member 20 is moved to the locking position, the extension arm 28 abuts against the right side wall of the groove 91. In this way, the movable space of the sliding member 20 may also be limited, and the user is provided with a tactile feedback that the operation is in place.

Refer to FIG. 2, FIG. 3, and FIG. 5 again. The housing 90 further includes a third positioning portion 95. The third positioning portion 95 is located in the groove 91 and between the first positioning portion 92 and the perforation 93. When the sliding member 20 is located at the release position, the second positioning portion 22 may be in contact with the third positioning portion 95. Operation feel of moving the sliding member 20 from an initial position (as shown in FIG. 4) to the release position (as shown in FIG. 5) and assembling the sliding member 20 is provided through the third positioning portion 95, to confirm whether the sliding member 20 is moved to the release position, so as to further assemble the knob 30.

As shown in FIG. 2 and FIG. 5, the central shaft 32 extends along a first direction X. It can be learned from operations in FIG. 1 and FIG. 7, the sliding member 20 is moved along a second direction Y. In addition, as shown in FIG. 4, a length of the release groove 23 in a third direction Z is greater than a length of the tightening groove 24 in the third direction Z. In this embodiment, the first direction X, the second direction Y, and the third direction Z are perpendicular to each other. Therefore, the length of the tightening groove 24 in the third direction Z is shorter, so that the tightening ring 10 is provided with a tight squeeze force in the third direction Z.

As shown in FIG. 2 and FIG. 4, the housing 90 further includes a plurality of protruding portions 94 extending and protruding toward the groove 91 in the third direction Z. The sliding member 20 further includes a plurality of sliding buckle portions 25 extending and protruding in the third direction Z. When the sliding member 20 is to be assembled in the groove 91, the plurality of sliding buckle portions 25 of the sliding member 20 may be aligned with a position other than the protruding part 94 first, for example, be aligned with a left side position of the protruding portion 94 located on the left as shown in FIG. 4. In this case, the sliding buckle portion 25 of the sliding member 20 may be moved to the groove 91, and is not blocked by the protruding portion 94. After the sliding buckle portion 25 of the sliding member 20 passes through the protruding portion 94, the sliding member 20 may be moved in the groove 91 along the second direction Y. As shown in FIG. 1, when the sliding member 20 is assembled in the groove 91 and is moved to the release position, the sliding buckle portion 25 is located below the protruding portion 94. In this case, under a relative limitation of the sliding buckle portion 25 and the protruding portion 94, the sliding member 20 may be limited from moving toward the first direction X and leaving the groove 91. In addition, a length of the protruding portion 94 is designed to enable the sliding buckle portion 25 to be blocked by the protruding portion 94 when the sliding member 20 is located at the release position or the locking position. This can ensure that the sliding member 20 will not move in the first direction X and leave the groove 91 during moving.

Refer to FIG. 2, FIG. 5, and FIG. 8 again. The through hole 21 includes a first end 211 and a second end 212 opposite to each other in the second direction Y. As shown in FIG. 5, when the sliding member 20 is located at the release position, the central shaft 32 abuts against the first end 211. In this embodiment, when the sliding member 20 is located at the release position, the first end 211 of the through hole 21 is slightly aligned with a right end of the perforation 93 of the housing 90. In this way, once the sliding member 20 is located at an initial assembling position as shown in FIG. 4, the first end 211 of the through hole 21 is located above the perforation 93 of the housing 90, such that the central shaft 32 cannot to be assembled in the perforation 93. When the sliding member 20 is moved to the release position, the central shaft 32 may penetrate into the perforation 93. In addition, because the central shaft 32 abuts against the first end 211, the sliding member 20 cannot be moved to the left along the second direction Y. Therefore, the sliding member 20 cannot be moved to a position at which the sliding buckle portion 25 is not blocked by the protruding portion 94 (that is, the assembling position shown in FIG. 4). Once the knob assembly 100 is assembled, as long as the knob 30 is not removed, the sliding member 20 cannot move away from the groove 91 along the first direction X.

Then, as shown in FIG. 8, when the sliding member 20 is located at the locking position, the central shaft 32 abuts against the second end 212, to limit a moving range of the sliding member 20. The user is also provided with operation feel, to avoid an excessive force.

As shown in FIG. 2, the sliding member 20 further includes a first stopping portion 26 and a second stopping portion 27. The first stopping portion 26 and the second stopping portion 27 are located on two opposite sides in the second direction Y. As shown in FIG. 1, when the sliding member 20 is located at the release position, the rotary table 31 abuts against the first stopping portion 26. As shown in FIG. 7, when the sliding member 20 is located at the locking position, the rotary table 31 abuts against the second stopping portion 27. In this embodiment, the first stopping portion 26 and the second stopping portion 27 are designed to be an arc-shaped protrusion corresponding to a shape of the rotary table 31. In another embodiment, the two portions may alternatively be in any shape.

Then, as shown in FIG. 2 and FIG. 3, the tightening ring 10 further includes a ring member 11 and two protruding members 12. The two protruding members 12 are disposed on two opposite sides of the ring member 11 in the third direction Z. A shape of the tightening groove 24 changes with setting of the protruding member 12. Through the setting of the protruding member 12, the protruding member 12 is more easily to be squeezed by a force from the tightening groove 24 in the third direction Z, so that the tightening ring member 11 is in tight contact with the central shaft 32 in the third direction Z.

In addition, the ring member 11 includes an opening 111, to enable the ring member 11 to form an open ring, and the opening 111 is located between the two protruding members 12. The opening 111 enables the ring member 11 to maintain a good elastic expansion space when being squeezed. Moreover, the ring member 11 may more tightly wrap the central shaft 32 after being squeezed.

Then, as shown in FIG. 3, the groove 91 includes a limiting groove 911 and a limiting rib 912. The limiting groove 911 is disposed around the perforation 93, and the limiting rib 912 is disposed in the limiting groove 911. When the tightening ring 10 is to be disposed in the groove 91, a center of the ring member 11 may be aligned with a center of the perforation 93 under the limitation of the limiting groove 911. In addition, an outer ring circumference of the tightening ring 10 includes a trench 13. When the tightening ring 10 is disposed in the groove 91, the trench 13 correspondingly penetrates through the limiting rib 912, to fix a position of the tightening ring 10, so that the tightening ring 10 do not rotate with the third direction Z as an axis.

In conclusion, after required rotation setting is performed on the knob 30 of the knob assembly 100, the sliding member 20 may be moved to the locking position through an operation, so that the tightening ring 10 fixes the knob 30. Therefore, the knob 30 cannot be easily rotated, thereby achieving position fixing. In this way, a precise fine-tuning function of the stepless knob assembly 100 can be retained, and a position of the knob assembly 100 can further be fixed after adjustment, to avoid setting inaccuracy caused by movement or vibration of an apparatus or a machine. When the knob 30 needs to be operated again, the knob 30 may be unlocked provided that the sliding member 20 is reversely operated, and the knob 30 may be operated again for rotation adjustment. Various positioning and limiting structures may also prevent the knob assembly 100 from dropping when the apparatus or the machine is moved, operated or tipped, and no tool is required during the assembly process, thereby improving assembly efficiency during manufacturing.

What is claimed is:

1. A knob assembly, assembled in a housing, to drive a rotary shaft disposed in the housing, wherein the housing comprises a groove and a perforation, the perforation is located in the groove, the rotary shaft penetrates through the perforation, and the knob assembly comprises:

a tightening ring, disposed in the groove and aligned with the perforation;

a sliding member, comprising a through hole, a release groove, and a tightening groove, wherein the release groove and the tightening groove are disposed adjacently and are in communication with each other, a diameter of the release groove is greater than a diameter of the tightening groove, and the sliding member is slidably disposed in the housing, to enable the tightening ring to be accommodated in the release groove or the tightening groove; and a knob, comprising a rotary table and a central shaft, wherein the central shaft is connected to the rotary table, sequentially penetrates through the through hole of the sliding member and the tightening ring to the perforation, and is sleeved on the rotary shaft, and when the sliding member is moved from a release position to a locking position, the tightening ring is moved from the release groove to the tightening groove, to enable the tightening ring to tightly wrap the central shaft of the knob, so as to fix a position of the knob.

2. The knob assembly according to claim 1, wherein the housing further comprises a first positioning portion located in the groove, the sliding member further comprises a second positioning portion, and the second positioning portion is correspondingly away from or in contact with the first positioning portion based on sliding of the sliding member.

3. The knob assembly according to claim 2, wherein when the sliding member is moved from the release position to the locking position, the second positioning portion is moved from a position away from the first positioning portion to a position in contact with the first positioning portion.

4. The knob assembly according to claim 2, wherein the housing further comprises a third positioning portion, the third positioning portion is located in the groove and between the first positioning portion and the perforation, and when the sliding member is located at the release position, the second positioning portion is in contact with the third positioning portion.

5. The knob assembly according to claim 1, wherein the central shaft extends along a first direction, the sliding member is moved along a second direction, a length of the release groove in a third direction is greater than a length of the tightening groove in the third direction, and the first direction, the second direction, and the third direction are perpendicular to each other.

6. The knob assembly according to claim 5, wherein the housing further comprises a plurality of protruding portions extending and protruding toward the groove along the third direction; and the sliding member further comprises a plurality of sliding buckle portions extending and protruding outward along the third direction, and when the sliding member is moved to the release position, the sliding buckle portions are located below the protruding portions.

7. The knob assembly according to claim 5, wherein the sliding member further comprises a first stopping portion and a second stopping portion that are located on two opposite sides in the second direction, when the sliding member is located at the release position, the rotary table abuts against the first stopping portion, and when the sliding member is located at the locking position, the rotary table abuts against the second stopping portion.

8. The knob assembly according to claim 5, wherein the tightening ring further comprises a ring member and two protruding members, and the two protruding members are disposed on two opposite sides of the ring member along the third direction.

9. The knob assembly according to claim 8, wherein the ring member comprises an opening, to enable the ring member to form an unclosed ring, and the opening is located between the two protruding members.

10. The knob assembly according to claim 1, wherein the tightening ring comprises an opening, to enable the tightening ring to form an unclosed ring.

11. The knob assembly according to claim 1, wherein the groove comprises a limiting groove and a limiting rib, an outer ring circumference of the tightening ring comprises a trench, the limiting groove is disposed around the perforation, the limiting rib is disposed in the limiting groove, the tightening ring is disposed in the groove, and the trench correspondingly penetrates through the limiting rib.

* * * * *